Nov. 22, 1927.　　　　　　　　　　　　　　　　　1,650,368
R. LA FRANCE
GLASS FORMING MACHINE
Filed Jan. 11, 1926　　　　2 Sheets-Sheet 1
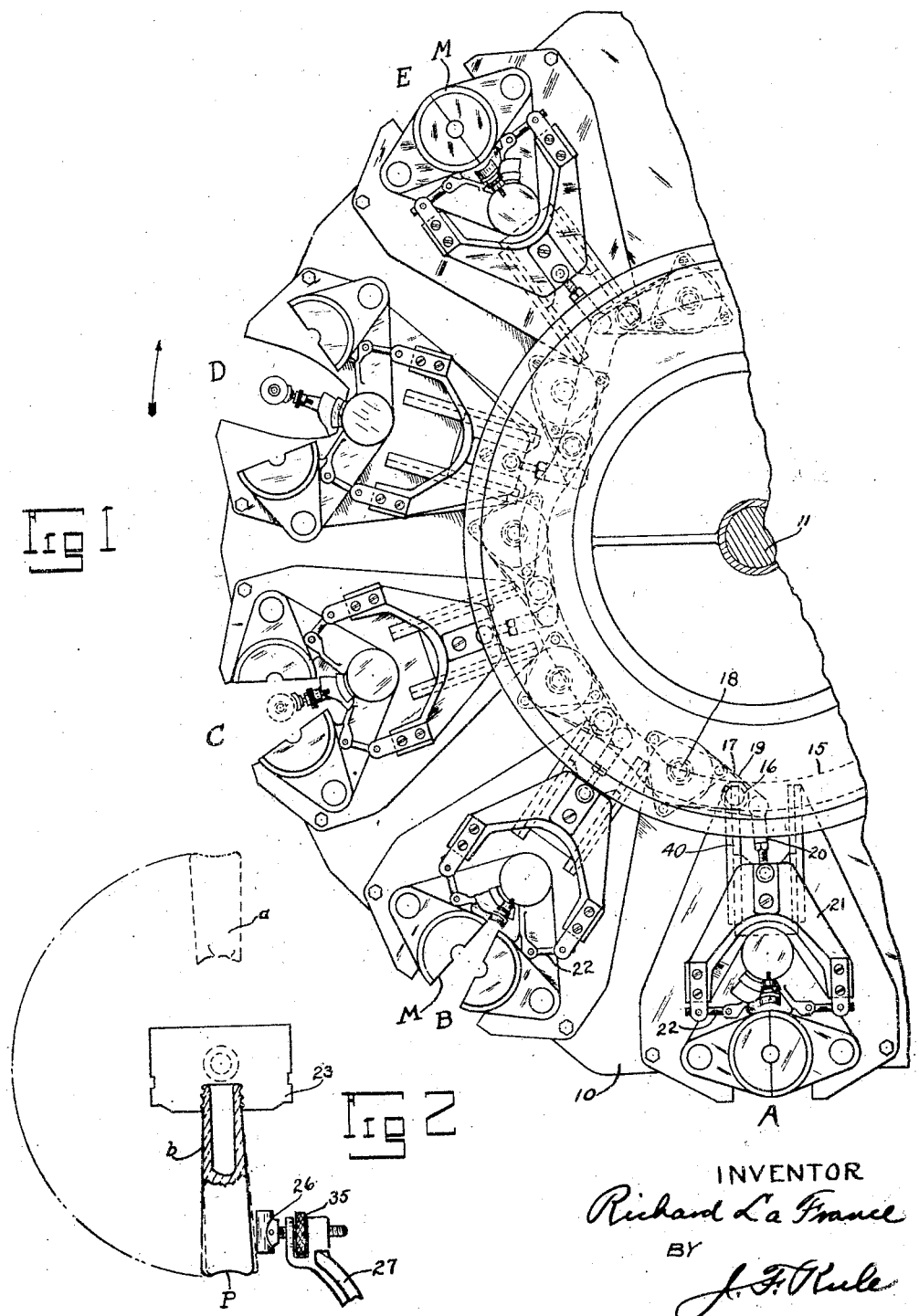
INVENTOR
Richard La France
BY
J. F. O'Keefe
HIS ATTORNEY Nov. 22, 1927. 1,650,368
R. LA FRANCE
GLASS FORMING MACHINE
Filed Jan. 11, 1926 2 Sheets-Sheet 2
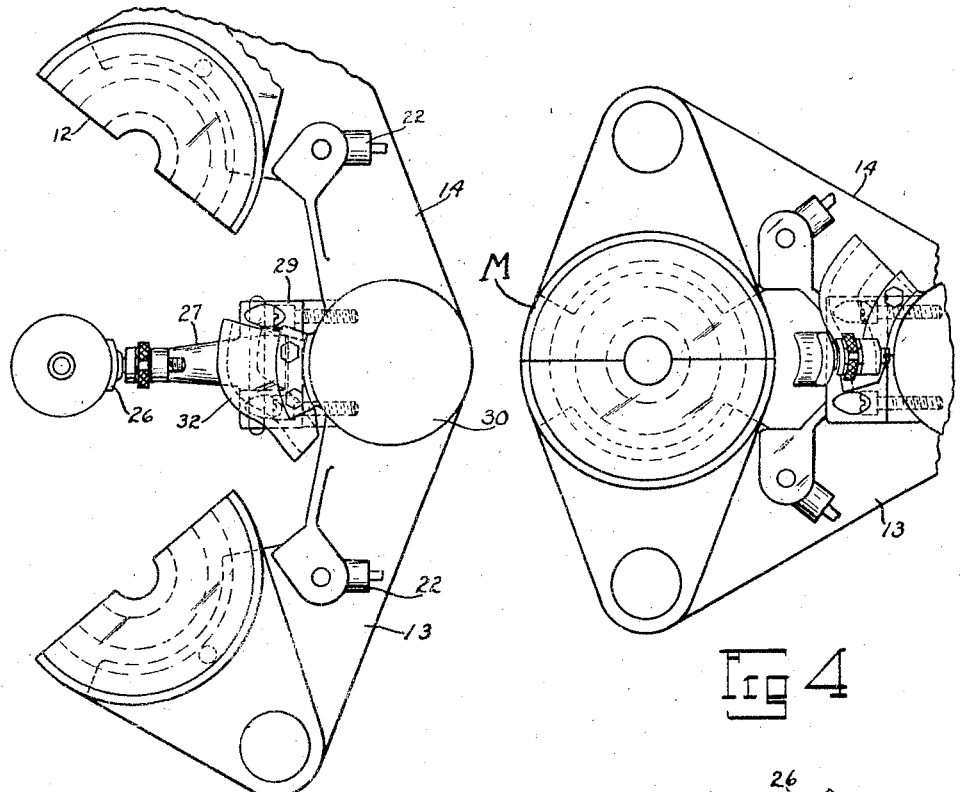
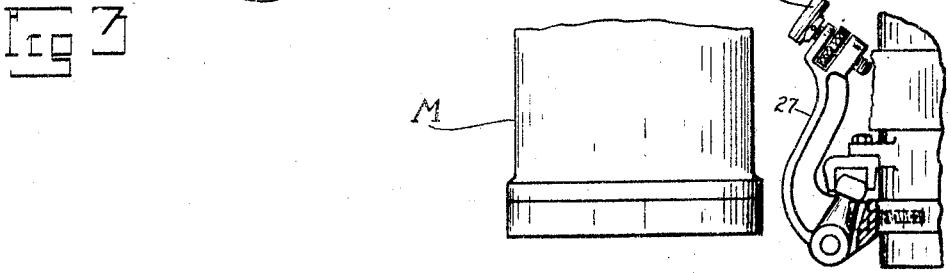
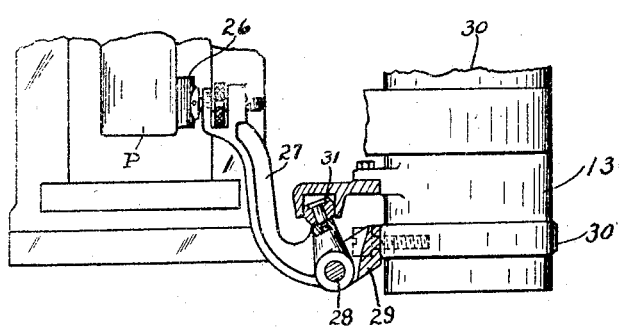
INVENTOR
Richard La France
BY
J. F. Rule.
HIS ATTORNEY Patented Nov. 22, 1927.

1,650,368

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed January 11, 1926. Serial No. 80,496.

My invention relates to glass forming machines adapted for making bottles or other hollow glassware, and particularly to machines in which a bare parison of plastic glass is held suspended before the finishing mold encloses it prior to the final blowing operation.

An object of the invention is to provide improved means for engaging and centering the depending parison before it is enclosed in the finishing mold. In its preferred form, the invention is adapted for use in a machine in which the bare parison after being formed in a blank mold and while supported in a neck mold, is swung downward by inverting the neck mold, thus swinging the parison from a position in which it extends upward from the neck mold, to a vertically depending position.

A further object of the invention is to permit a rapid inverting movement of the parison in its transfer from the blank mold to position to be enclosed in the finishing mold, and at the same time avoid injury to the blank as it is arrested at the completion of its downward swing.

Other features of the invention will appear hereinafter.

In the accompanying drawings:

Figure 1 is a fragmentary plan view showing a series of finishing molds and the blank centering means.

Figure 2 is a diagrammatic view illustrating the inverting movement of the parison and showing the centering arm positioned to arrest the parison.

Figure 3 is a plan view of an open finishing mold and the blank centering arm.

Figure 4 is a similar view showing the centering arm withdrawn and the mold closed.

Figure 5 is a part sectional elevation showing the centering arm in engagement with the depending parison.

Figure 6 is an elevation showing the centering arm withdrawn and the mold in closed position.

The invention is herein shown as applied to a bottle blowing machine comprising a mold carriage 10 which rotates about a central stationary column 11. A series of finishing molds M are mounted on the mold carriage to rotate therewith. Each mold comprises separable sections 12 carried on arms 13 and 14 mounted to swing about a common axis. The means for effecting and controlling the opening and closing movements of the molds, comprises a stationary cam 15 (Fig. 1). Operating connections between each mold and the cam comprise a roll 16 running on the cam, said roll carried by an arm 17 secured to a rock shaft 18 to which is also connected an arm 19, the free end of which is connected through a link 20 with a yoke 21. The yoke is connected to a slide block movable radially of the mold carriage in guideways 40, and is connected through links 22 to the mold-carrying arms 13 and 14.

As the mold carriage rotates, each finishing mold is brought successively to the positions A, B, C, D and E. The cam 15 is so shaped that the mold is held closed while at the position A. As it travels to position B, it is partially opened. At position C it is opened still wider, but not to its fullest extent. At position D it is fully opened. At position E it is again closed.

The parisons of glass are given a preliminary shaping in blank molds (not shown) while the neck end of the parison is formed in a neck mold 23 (Fig. 2). The blank mold then opens, leaving the bare parison P projecting upward from the neck mold, after which the neck mold is inverted about a horizontal axis to swing the parison from the upright position $a$ (Fig. 2) to the vertically depending position $b$.

When the bare parison is swung downward by the inversion of the neck mold, it is centered with respect to the finishing mold before the latter closes, by means of a centering device comprising a centering finger or plate 26 carried by an arm 27 pivoted at 28 to a yoke 29 attached to a non-rotating shaft 30. The arm 27 carries a cam roll 31 which runs in a cam groove formed in a cam plate 32. The cam plate is attached to the hub of the arm 13 so that the cam swings about the axis of the shaft 30 during the opening and closing movements of the finishing mold.

The parison P is swung downward by inverting the neck mold 23 and is thereby brought between the separated sections of the finishing mold when the latter is at position C (Fig. 1). The finishing mold at this time is open, but not to its widest extent. The inverting movement of the neck mold is arrested when the parison reaches its vertical depending position shown in full lines in Figure 2. The centering finger 26 at this time is held in the Figure 2 position, permitting the parison after the neck mold is arrested, to swing a short distance beyond its depending vertical position to the dotted line position before engaging the centering finger. This positioning of the centering finger so that the parison can swing a short distance beyond central position, prevents the parison from being arrested too suddenly and thereby prevents distortion and also prevents cracking or checking of the glass adjacent to the neck mold, which might otherwise occur. Flattening and chilling of the hollow parison because of prolonged and severe contact of the centering finger therewith, is also avoided.

After the parison is arrested at position C, the finishing mold sections are further separated by means of the cam 15 during their travel to position D, thereby completing the opening movement of the mold. This moves the cam 32 to a position to swing the centering finger 26 forward sufficiently to return the blank to its vertical position shown at D (Fig. 1) and in full lines in Figure 2. In this position, the parison is accurately centered with respect to the finishing mold. When the parison is definitely centered, a mold bottom plate (not shown) is raised to contact with the parison and retain it in its centered position. The finishing mold sections are now swung to their closed position E, such movement serving to withdraw the centering arm 27 backward to the Figure 6 position to clear the finishing mold before the latter closes around the parison. The centering finger 26 is adjustable by means of a thumb piece 35 threaded on the stem of the centering finger. After the finishing mold closes around the parison, the latter is blown therein to its finished form by means of air supplied through the neck mold, after which the finishing mold is opened and the bottle discharged.

Modifications may be resorted to within the spirit and scope of my invention.

What I claim is:

1. In a glass forming machine, the combination of a mold carriage, means on the carriage to support a parison of plastic glass with the bare parison extending beyond its support, a mold, means for actuating the mold, mechanism providing operating connections between said actuating means and the mold for causing the mold to enclose the parison, and a parison centering device separate from the mold and actuated by said mechanism to engage the parison and center it with respect to the mold.

2. The combination of means to suspend a parison of plastic glass, a centering device, a mold, a cam, mechanism actuated by said cam for actuating the mold to cause it to enclose the parison, and operating connections between said mechanism and said centering device for causing the latter to center the parison with respect to the mold.

3. The combination of means to suspend a parison of plastic glass, a centering device, a mold, a cam, mechanism actuated by said cam for actuating the mold to cause it to enclose the parison, and means operated by said mechanism to withdraw the centering device to position to clear the mold as the latter encloses the parison.

4. In a glass forming machine, the combination of a split mold, pivoted arms carrying the mold sections, means to suspend a bare parison of plastic glass, means to actuate said arms and bring the mold sections together to enclose the parison, a centering device positioned to engage the parison when the mold is open and center it, and means actuated by said arms as the mold closes to withdraw the centering device.

5. In a glass forming machine, the combination of a split mold, pivoted arms carrying the mold sections, means to suspend a bare parison of plastic glass, means to actuate said arms and bring the mold sections together to enclose the parison, a centering device positioned to engage the parison when the mold is open and center it, a cam connected to one of said arms, and operating connections between the cam and said centering device.

6. In a glass forming machine, the combination of a rotating mold carriage, means thereon for forming and suspending a bare parison of glass, a sectional mold, mechanism on the mold carriage and traveling therewith for transmitting movement to the mold sections for opening the mold and for closing it around the parison, a centering device movable between the separated mold sections into position to center the parison with respect to the mold, and means actuated by said mechanism during the closing movement of the mold to withdraw said centering device and permit the mold sections to be brought together.

7. In a glass forming machine, the combination of means to form and support a parison of plastic glass with the parison projecting upward from its support, means to actuate said support and swing the bare parison downward to a depending position, a mold to enclose the depending parison, a centering device positioned to permit the free end of the parison to be carried beyond its normal position as it swings downward and to arrest the parison, and means to actuate the centering device and cause it to return the parison to centered position before it is enclosed by the mold.

8. In a glass forming machine, the combination of a neck mold and means cooperating therewith to form a parison of plastic glass extending upward from the neck mold, a sectional finishing mold, means to rotate the neck mold and swing the bare parison downward to and beyond a central depending position with respect to the finishing mold, means to limit said swinging movement of the parison comprising a parison centering device, means for actuating said centering device and causing it to return the parison to central position with respect to the finishing mold, and means for closing the finishing mold around the centered parison.

9. In a glass forming machine, the combination of a neck mold and means cooperating therewith to form a parison of plastic glass extending upward from the neck mold, a sectional finishing mold, means to rotate the neck mold and swing the bare parison downward to and beyond a central depending position with respect to the finishing mold, a centering device positioned to permit the parison to swing beyond its normal depending position and forming a stop positioned to arrest the parison at the end of said swing, means to then actuate said centering device and cause it to return the parison to central position with respect to the finishing mold, and means to operate the finishing mold to enclose the parison.

10. In a glass forming machine, the combination of a neck mold, means cooperating therewith to form a parison of glass extending upward from the neck mold, a sectional finishing mold beneath the neck mold, means to invert the neck mold and thereby swing the parison downward to a depending position between the open finishing mold sections, a centering arm between said mold sections in position to arrest the parison when the latter has swung a short distance beyond a central position with respect to the finishing mold, and means to then advance said arm to center the parison and then withdraw said arm to clear the finishing mold and permit it to enclose the parison.

11. In a glass forming machine, the combination of means to form and suspend a bare parison of plastic glass, a sectional mold to enclose the parison, swinging arms carrying the mold sections, a parison centering device located between said arms, and means actuated by said arms to withdraw said centering device from the path of the mold sections to permit the mold sections to come together and enclose the parison.

12. In a glass forming machine, the combination of means to form and suspend a bare parison of plastic glass, a sectional mold to enclose the parison, swinging arms carrying the mold sections, a parison centering device located between said arms, a cam carried by one of said arms, and operating connections between said cam and the mold centering device.

13. In a glass forming machine, the combination of a rotating mold carriage, means thereon for forming and suspending a bare parison of glass, a finishing mold to enclose the parison, a parison centering device arranged to engage the parison and center it with respect to the finishing mold while the latter is open, and mechanism carried on the mold carriage between the finishing mold and the center of the mold carriage for moving the centering device to operating position and for withdrawing it to permit the finishing mold to enclose the parison.

14. In a glass forming machine, the combination with means for forming and suspending a parison of plastic glass, of a mold, a parison centering device separate from the mold, a cam, and interconnected mechanism between the mold and centering device actuated by said cam and operable thereby to cause the centering device to center the parison with respect to the mold, withdraw the centering device, and close the mold about said parison.

15. In a glass forming machine, the combination of a sectional mold, a parison centering device movable into and out of the path of the mold sections, a cam, and mechanism actuated thereby for causing said movements of the centering device and for opening and closing the mold.

Signed at Toledo, in the county of Lucas and State of Ohio, this 8th day of January, 1926.

RICHARD LA FRANCE.